United States Patent
Kutaragi

(10) Patent No.: US 6,970,642 B1
(45) Date of Patent: Nov. 29, 2005

(54) METHOD AND ELECTRONIC DEVICE FOR DECODING COMPRESSED IMAGE DATA AND AUXILIARY RECORDING DEVICE

(75) Inventor: Ken Kutaragi, Kanagawa (JP)

(73) Assignee: Sony Computer Entertainment Inc., (JP)

( * ) Notice: Subject to any disclaimer, the term of this patent is extended or adjusted under 35 U.S.C. 154(b) by 1107 days.

(21) Appl. No.: 09/657,895

(22) Filed: Sep. 8, 2000

(30) Foreign Application Priority Data

| Sep. 12, 1999 | (JP) | ................................ 11-298690 |
| Nov. 30, 1999 | (JP) | ................................ 11-341198 |

(51) Int. Cl.[7] ............................................. H04N 5/91
(52) U.S. Cl. ........................ 386/95; 386/112; 386/126
(58) Field of Search ............................ 386/46, 95, 98, 386/111, 112, 125, 126, 109; 463/43

(56) References Cited

U.S. PATENT DOCUMENTS

| 5,285,275 A |   | 2/1994 | Abe ............................ 348/384 |
| 6,055,565 A | * | 4/2000 | Inai ............................. 709/218 |
| 6,071,193 A |   | 6/2000 | Suzuoki |
| 6,279,830 B1 | * | 8/2001 | Ishibashi ..................... 235/494 |
| 6,582,311 B1 | * | 6/2003 | Sugimura ..................... 463/43 |

FOREIGN PATENT DOCUMENTS

| EP | 0 737 008 A2 | 10/1996 |
| EP | 0 737 975 A2 | 10/1996 |
| EP | 0 847 191 A2 | 6/1998 |
| EP | 933724 A1 * | 8/1999 |
| JP | 02-123883 A | 5/1990 |
| JP | 05-145889 A | 6/1993 |
| JP | 10-098719 A | 4/1998 |
| JP | 10-285593 A | 10/1998 |
| JP | 11-112990 A | 4/1999 |

* cited by examiner

Primary Examiner—Huy Nguyen
(74) Attorney, Agent, or Firm—Lerner, David, Littenberg, Krumholz & Mentlik, LLP

(57) ABSTRACT

A method for decoding compressed image data recorded in an optical disk includes the steps of recording program data capable of performing partial decoding, in addition to the compressed image data, in the optical disk in advance; recording the program data temporarily in a memory card removably installed in an electronic device; recording the program data recorded in the memory card into a main memory within the electronic device; reading the compressed image data from the optical disk into the electronic device using a decoding unit arranged in the electronic device to decode the compressed image data partially; and decoding the partially decoded compressed image data by the program data recorded in the memory of the electronic device. The decoding method and the electronic device used to decode the compressed image data allow for future updates and improvements and real-time decoding.

26 Claims, 12 Drawing Sheets

CODING ORDER OF I AND P PICTURES

CODING ORDER OF I, P, B PICTURES

METHOD AND ELECTRONIC DEVICE FOR DECODING COMPRESSED IMAGE DATA AND AUXILIARY RECORDING DEVICE

FIELD OF THE INVENTION

The present invention relates to a method and an electronic device for decoding compressed image data and an auxiliary recording device.

BACKGROUND OF THE INVENTION

A video game device is exemplified as an entertainment system. In the entertainment system such as a video game device, an optical disk such as a CD-ROM and a DVD-ROM, for example, is used as a recording medium in which a game program is recorded. Video (image) information and audio (voice) information constituting a game is recorded in such an optical disk. In general, a content of the image information is significantly large. Thus, it is not practical to record the image information in the optical disk as it is.

Therefore, image data is coded and compressed for recording in the optical disk.

In order to load into the video game device the optical disk with compressed image data recorded and to reproduce the image data recorded in the optical disk, it is necessary for a game device body to decode (expand) the compressed image data. Conventionally, such a decoding unit is provided within the game device body as hardware units. The decoding unit is also technically improved rapidly as well as other technologies.

However, as described above, if the decoding unit is configured by hardware units, it becomes harder to update/improve the decoding unit in accordance with an advance of the decoding technology. Thus, it could be considered that the decoding means is programmed and configured by software means so that it can be reprogrammed anytime. However, if the whole decoding unit is configured by software means, its processing time tends to increase as compared with one configured by hardware units, generally.

In the case of the video game device, data to be recorded in the optical disk is compressed before the optical disk is provided to a user (game player), and the decoding is done by a game device manufacturer or a game software manufacturer. Thus, time required for compressing data to be recorded in the optical disk is not such a big problem.

On the other hand, the compressed data must be decoded (expanded) from the optical disk while the game is executed and enjoyed by a user. Then, the required time for decoding (expanding) the compressed data becomes a critical matter and real time processing is demanded.

SUMMARY OF THE INVENTION

Therefore, it is an object of the present invention to provide a method and an electronic device for decoding new compressed data and an auxiliary recording device.

Further, it is an object of the present invention to provide a method and an electronic device for decoding compressed data and an auxiliary recording device all of which, in decoding compressed data recorded in a recording medium, can be updated/improved in response to advances of decoding technologies and can realize its real-time processing.

A method for decoding compressed image data according to a first aspect of the present invention includes the steps of recording program data in advance, which can perform partial decoding, on an optical disk where compressed image data is recorded, in addition to the compressed image data, recording the program data, which can perform the partial decoding, in a memory of an electronic device when the optical disk is loaded in the electronic device, reading the compressed image data from the optical disk into the electronic device, using a decoding means arranged within the electronic device to decode the compressed image data partially, and decoding the compressed image data, which has been decoded partially, by the program data, which is recorded in the memory of the electronic device and can perform partial decoding.

Further, in the method for decoding the compressed image data according to the first aspect, the step of recording the program data, which can perform partial decoding, in the memory of the electronic device when the optical disk is loaded in the electronic device may include the step of recording the program data in a memory card, which is an auxiliary recording device removably installed in the electronic device.

Further, in the method for decoding the compressed image data according to the first aspect, the step of recording the program data, which can perform partial decoding, in the memory of the electronic device when the optical disk is loaded in the electronic device may include the step of recording the program data temporarily in the memory card, which is an auxiliary recording device removably installed in the electronic device, and then recording the program data having been recorded in the memory card in a main memory within the electronic device.

Further, in the method for decoding the compressed image data according to the first aspect, the step of recording the program data, which can perform partial decoding, in the memory of the electronic device when the optical disk is loaded in the electronic device may include the step of recording the program data in a ROM, which is provided in the electronic device and can be written to at least once. The ROM, which can be written to at least once, is preferably a flash memory.

Further, in the method for decoding the compressed image data according to the first aspect, the step of recording the program data, which can perform partial decoding, in the memory of the electronic device when the optical disk is loaded in the electronic device may include the step of recording the program data in a ROM, which is provided in the electronic device and can be written to at least once, and then recording the program data having been recorded in the ROM in the main memory within the electronic device. The ROM, which can be written to at least once, is preferably a flash memory.

Further, in the method for decoding the compressed image data according to the first aspect, the optical disk is preferably a CD-ROM, a DVD-ROM or a DVD-VIDEO.

Further, in the method for decoding the compressed image data according to the first aspect of the present invention, the electronic device is preferably an entertainment system.

Further, in the method for decoding the compressed image data according to the first aspect of the present invention, the electronic device is preferably a game device, and the compressed image data is preferably a game program.

Further, in the method for decoding the compressed image data according to the first aspect, the compressed image data may be compressed based on the MPEG method, which is an international standard for motion picture compression.

Further, in the method for decoding the compressed image data according to the first aspect, the program data, which is recorded in the optical disk in advance and can perform partial decoding, may be movement compensation program data. Further, in the method for decoding the compressed image data according to the first aspect, the steps of reading the compressed image data from the optical disk to the electronic device and using a decoding unit arranged within the electronic device to decode the compressed image data partially may be performed by a VLC decoder, an inverse-quantization means and an IDCT means provided in an image decoder within the electronic device.

Further, in the method for decoding the compressed image data according to the first aspect, the VLC decoder, the inverse-quantization unit and the IDCT means may be configured by hardware means.

An electronic device according to a second aspect of the present invention decodes compressed image data recorded in an optical disk. There is recorded in the optical disk in advance program data, which can perform partial decoding, in addition to the compressed image data. The electronic device includes at least an image decoder means for reading the compressed image data from the optical disk into the electronic device and decoding the compressed image data partially and a memory means for reading and recording program data, which can perform partial decoding, when the optical disk is loaded in the electronic device. The electronic device reads the compressed image data from the optical disk into the electronic device, uses the image decoder to decode the compressed image data partially, and further decodes, by the program data recorded in the memory in the electronic device, the compressed image data having been decoded partially.

The electronic device according to the second aspect of the present invention may further include a memory card, which is an auxiliary recording device installed removably in the electronic device. The electronic device reads and records program data, which is recorded in the optical disk and can perform partial decoding, into the memory card, reads the compressed image data from the optical disk into the electronic device, uses the image decoder to decode the compressed image data partially, and further decodes by the program data recorded in the memory card the compressed image data having been decoded partially.

The electronic device according to the second aspect of the present invention further includes a memory card, which is an auxiliary recording device installed removably in the electronic device. The electronic device reads and temporarily records the program data, which is recorded in the optical disk and can perform partial decoding, into the memory card and further reads and records the program data recorded in the memory card into a main memory within the electronic device, reads the compressed image data from the optical disk into the electronic device, uses the image decoder to decode the compressed image data partially, and further decodes, by the program data recorded in the main memory, the compressed image data having been decoded partially.

The electronic device according to the second aspect of the present invention further includes a ROM, which can be written to at least once, equipped in the electronic device, reads and records the program data, which is recorded in the optical disk and can perform partial decoding, into the ROM, reads the compressed image data from the optical disk into the electronic device, uses the image decoder to decode the compressed image data partially, and further decodes, by the program data recorded in the ROM, the compressed image data having been decoded partially.

The electronic device according to the second aspect of the present invention may further include a ROM, which can be written to at least once, and is equipped in the electronic device, reads and records the program data, which is recorded in the optical disk and can perform partial decoding, temporarily into the ROM, further reads and records the program data recorded in the ROM into a main memory within the electronic device, reads the compressed image data from the optical disk into the electronic device, uses the image decoder to decode the compressed image data partially, and further decodes, by the program data recorded in the main memory, the compressed image data having been decoded partially. The ROM is preferably a flash memory.

In the electronic device according to the second aspect of the present invention, the optical disk may be a CD-ROM, a DVD-ROM or a DVD-VIDEO.

In the electronic device according to the second aspect of the present invention, the electronic device is preferably an entertainment system.

In the electronic device according to the second aspect of the present invention, the electronic device is preferably a game device, and the compressed image data is preferably a game program.

Further, in the electronic device according to the second aspect of the present invention, the compressed image data is preferably image-compressed based on the MPEG method, which is an international standard for moving picture compression.

In the electronic device according to the second aspect of the present invention, the program data, which is recorded in the optical disk in advance and can perform partial decoding, is preferably movement compensation program data.

In the electronic device according to the second aspect of the present invention, the image decoder for reading the compressed image data from the optical disk into the electronic device and decoding the compressed image data partially may include a VLC decoder means, an inverse-quantization means and an IDCT means.

In the electronic device according to the second aspect of the present invention, the VLC decoder means, the inverse-quantization means and the IDCT means may be configured by hardware.

An auxiliary recording device according a third aspect of the present invention is installed removably in a device constituting an entertainment system. The auxiliary recording device reads program data temporarily recorded in an optical disk loaded in the entertainment system and writes the program data into a main memory of the entertainment system. In this case, the program data having been written in the main memory cooperates with units provided in the entertainment system to perform a certain function on data read from the optical disk.

The auxiliary recording device according to the third aspect of the present invention may read and record program data recorded in an optical disk loaded in the entertainment system. In this case, the program data having been written in the auxiliary recording device preferably cooperates with units provided in the entertainment system to perform a certain function on data read from the optical disk.

In the auxiliary recording device according to the third aspect of the present invention, the data read from the optical disk may be compressed image data, and the certain function is preferably to decode the compressed image data.

Further, in the auxiliary recording device according to the third aspect of the present invention, the units provided in the entertainment system may be configured by hardware.

According to the present invention, in decoding compressed image data recorded in a recording medium (optical disk), partial decoding may be configured by software to allow future updates and improvements. Further, a partial decoding unit may be configured by hardware to achieve real-time processing.

DESCRIPTION OF THE PREFERRED EMBODIMENTS

Figure 1:
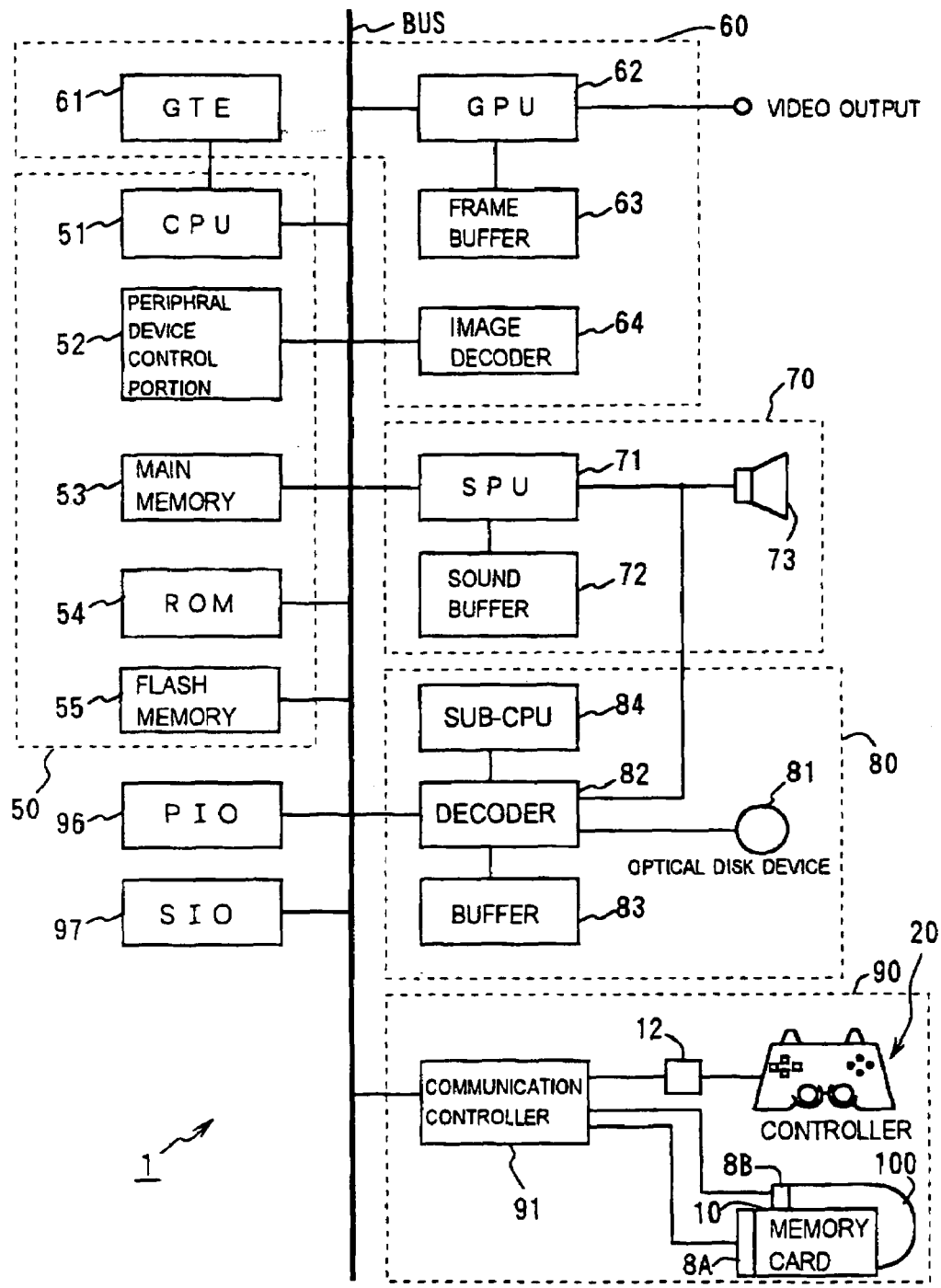
FIG. 1 is an entire circuit block diagram of a video game device, which is a typical example of an entertainment system.

A preferred embodiment of the present invention will be described in detail with reference to the accompanying drawings. Identical reference numerals are used for indicating identical elements in the drawings, respectively, and repeated descriptions for the same elements will be omitted here.

[Entertainment System In General]

FIG. 1 is a block diagram for showing schematically an example of a circuit configuration of a main portion of a typical video game device as an entertainment system.

An entertainment system 1 broadly includes a control system 50 having a central processing unit (CPU) 51 and its peripheral system, a graphic system 60 having a graphic processing unit (GPU) 62 for drawing in a frame buffer 63, a sound system 70 having a sound processing unit (SPU) for generating music, sound effects and others, an optical disk control portion 80 for controlling an optical disk 81 where an application program is recorded, a communication control unit 90 for controlling input/output of data from a memory card 10 for storing a signal from a controller 20 to which a user inputs his/her instruction and settings for the game, and a bus (BUS) to which each of the above-described portions is connected.

Elements for constructing each of the blocks 50, 60, 70, 80 and 90 will be described. The control system 50 includes the CPU 51, a peripheral device control unit 52 for controlling interruptions and direct memory access (DMA) transfers, the main memory 53 having a random access memory (RAM) and a read only memory (ROM) 54 for storing programs including a so-called operating system for managing the main memory 53, a graphic system 60, a sound system 70, and others. It should be noted that the main memory 53 here can execute programs on its memory, and in another embodiment described later, the control system 50 has a flash memory.

The CPU 51 executes an operating system stored in the ROM 54 to control the entire video game device 1 and includes a 128-bit reduced instruction set computer-CPU (RISC-CPU), for example.

When the video game device 1 is powered on, the CPU 51 in the control system 50 executes the operating system stored in the ROM 54 to thereby control the graphic system 60, the sound system 70, and so on. Further, when the operating system is executed, the CPU 51 performs initialization of the entire video game device 1, including checking operations. Then, the CPU 51 controls the optical disk control portion 80 to execute application programs, such as a game, recorded in the optical disk 81. By executing the program, such as a game, the CPU 51 controls the graphic system 60, the sound system 70, and so on in order to control image display and generation of sound effects, music, and so on in response to input of a user.

Also, the graphic system 60 includes a geometry transfer engine (GTE) 61 for performing coordinates conversion and the like, the GPU 62 for drawing based on a drawing instruction from the CPU 51, the frame buffer 63 for storing an image drawn by the GPU 62, and an image decoder 64 for decoding compressed image data by means of orthogonal conversion such as discrete cosine transform as described later.

The GTE 61 has a parallel operating system for executing a plurality of operations in parallel and functions as a co-processor, which can perform, at high speed, coordinate conversion, light source calculation, and computation of a matrix or a vector based on a computing request from the above-described CPU 51. Thus, in this video game device 1, loads on the CPU 51 are reduced and processing including high-speed coordinate computation can be performed.

The GPU 62 draws a polygon, for example, for the frame buffer 64 based on a drawing instruction from the CPU 51. Also as described later, the GPU 62 outputs from its video output image data, which is decoded in the image decoder 64 functioning as an image decoding unit and further decoded by an MPEG decode program transferred to the main memory 53.

The above-described frame buffer 63 has a dual port RAM and can simultaneously perform drawing by the GPU 62 or data transfer from the main memory 53 and reading of data for display. The frame butter 63 has a capacity of several M bites, for example, and data stored therein is dealt with as data of a matrix configured by 1024 pixels in width by 512 pixels in length in which a pixel data has 16 bits. The frame buffer 63 is also provided with a display region whose data is to be output as a video output as well as a color look up table (CLUT) region, which stores a CLUT to be referred to when the GPU 62 draws a polygon and the like, and a texture region which stores a texture to be coordinate-converted during drawing and inserted in the polygon and the like drawn by the GPU 62. These CLUT and texture regions are changed dynamically based on a change in the display region.

The GPU 62 can perform flat-shading as well as Gouraud shading for determining a color within the polygon by complementing it from a color at the top of the polygon, and texture mapping for pasting to the polygon a texture stored in the texture region.

As will be described later on, the image decoder 64, under the control of the CPU 51, partially decodes image data of a still picture or a moving picture stored in the main memory 53 and stores them in the main memory 53.

The reproduced image data is stored in the frame buffer 63 through the GPU 62 and can be used as a background of an image drawn by the above-described GPU 62.

The sound system 70 includes an SPU 71 for generating music, sound effects, and the like based on an instruction from the CPU 51, a sound buffer 72 where waveform image data and the like are recorded by the SPU 71, and a speaker 73 for outputting music, sound effects and the like generated by the SPU 71.

The SPU 71 includes an adaptive differential PCM (AD-PCM) decoding function for reproducing audio data subjected to ADPCM on 16-bit audio data as a 4-bit differential signal, for example, a reproducing function for reproducing waveform data stored in the sound buffer 72 in order to generate sound effects and the like and a modulating function for modulating and reproducing the waveform data stored in the sound buffer 72.

Having those functions enables the sound system 70 to be used as a so-called sampling sound source for generating music, sound effects, and the like based on the waveform recorded in the sound buffer 72 through the instruction from the CPU 51.

The optical disk control unit 80 includes a disk drive for driving the optical disk 81 used for reproducing a program, data and the like recorded in the optical disk 81, a decoder 82 for decoding the program, the data and the like recorded with an error correction code (ECC), for example, and a buffer 83 for storing data from the optical disk 81 temporarily to allow high-speed data readout from the optical disk 81. A sub-CPU 84 is connected to the decoder 82.

Audio data recorded in the optical disk 81 to be read out in the optical disk 81 includes ADPCM data as well as so-called PCM data generated by analog-digital converting an audio signal.

As ADPCM data, audio data where difference of 16-bit digital data is represented and recorded in 4-bit is decoded in the decoder 82. Then, the data is supplied to the above-described SPU 71 and digital-analog converted in the SPU 71 to be used to drive the speaker 73.

As PCM data, audio data recorded as 16-bit digital data is decoded in the decoder 82 to be used to drive the speaker 73.

Communication control unit 90 includes a communication controller 91 for controlling communication with the CPU 51 through the BUS. The communication controller 91 is equipped with a controller connection unit 9 to which the controller 20 for inputting an instruction from a user is connected and memory card insertion portions 8A and 8B to which the memory card (auxiliary storage device) 10 and/or a portable electronic equipment 100 for storing setting data and the like of a game described later is connected.

The controller 20 connected to the controller connection unit 9 has 16 instruction keys, for example, for inputting instructions from the user and sends a status of the instruction keys to the communication controller 91 about 60 times per second through simultaneous communication based on an instruction from the communication controller 91. Then, the communication controller 91 sends the instruction key status of the controller 20 to the CPU 51.

Thus, the instruction from the user is input to the CPU 51, which performs processing by following the instruction from the user based on the game program and the like being executed.

Here, large contents of image data must be transferred rapidly displaying an image or drawing among the main memory 53, the GPU 62, the image decoder 64, the decoder 82 and the like during reading out a program. Then, in the video game device 1, a so-called DMA transfer can be performed by which data is transferred directly among the main memory 53, the GPU 62, the image decoder 64, the decoder 82 and the like described above under the control of the peripheral device control unit 52. Thus, loads on the CPU 51 caused by data transfer can be reduced, and high-speed data transfer can be achieved.

Further, when setting data and the like of the game being executed must be stored, the CPU 51 sends data to be stored to the communication controller 91, which writes the data from the CPU 51 into the memory card 10 inserted into a slot of the memory card insertion portion 8A or 8B or the portable electronic device 100 (also with a function as a memory card). The memory card 10 or the portable electronic device 100 functions as an auxiliary memory medium (auxiliary memory device) removably attached to the video game device body.

Here, a protective circuit for preventing electronic destruction is built in the communication controller 91. The memory card 10 or the portable electronic device 100 is separated from the BUS and can be attached and removed when the game device body is powered on. Therefore, if there is not enough storage capacity available in the memory card 10 or the portable electronic device 100 described above, for example, a new memory card 10 or the like can be inserted without shutting down the power supply of the device body. Thus, the new memory card 10 or the like can be inserted without losing game data needing backup, and needed data can be written into the new memory card 10 or the like. Similarly, as described later, when the memory card 10 is used for other purposes, it can be replaced easily.

A parallel I/O interface (PIO) 96, and a serial I/O interface (SIO) 97 are interfaces for connecting the memory card 10 and/or the portable electronic device 100 described above to the video game device 1.

The present invention relates to a technology for decoding (expanding) compressed image data recorded in the optical disk 81 by making good use of software means and hardware means.

[Image Compression Technology]

The present invention relates to a technology for compressing image data closely. Therefore, the technology for compressing image data will be described briefly first for easy understanding of the present invention.

The international standards for the image data compression technology have been known or proposed such as H. 261 coding method, the Joint Photographic Coding experts Group (JPEG) known as a color still image compression standard, the Moving Picture Experts Group 1 (MPEG 1) known as a color moving image compression standard for an accumulating medium mainly, and MPEG 2 in consideration with applications to communication and broadcasting media. Here, the MPEG 2 will be described briefly as an example for the image data compression technology that is practical at the moment.

The information content of an image, in particular, of a moving image, is significantly large, and it is not practical to be accumulated as it is or used for communication. Since digital image information has values for luminance (brightness) and chromaticity (color information), they are compressed separately.

The information compression method uses, in combination, information compressions using intra-screen (spatial) correlation, inter-screen (time-serial) correlation, and a discrete code frequency when coding based on those methods (hybrid coding).

The information compression using the intra screen (spatial) correlation uses a characteristic that values of adjacent pixels are close to each other (i.e. high correlation), in brief. Here, an image having a rough pattern and varying slowly is considered as being low in its spatial frequency while one having a fine pattern and varying rapidly as checkers is considered as being high in its spatial frequency.

When one image is converted for a certain square region, it can break down step-wise images starting from an average image within the region (the whole region is uniform and its frequency is low) to images representing fineness gradually (to higher frequency). This breakdown operation is called orthogonal conversion, and higher fineness is called higher frequency. A natural image is represented by overlapping images broken down from the low frequency sections (average image) to the high frequency sections in order.

While there are various methods for the orthogonal conversion, the discrete cosine transform (DCT) is known as the most efficient method. The merit of the DCT is to be able to perform information compression by removing high frequency sections because large pixel values (for example, luminance) concentrate to the low frequency sections after conversion while pixel values before conversion have been distributed randomly.

In order to remove the higher frequency sections, quantization is performed. The quantization is defined as to divide a pixel value by a given value (divisor) and round off a remainder.

The coding process based on the intra-screen (spatial) correlation includes (1) dividing one image into 8×8 pixel blocks, for example, (2) converting (DCT operation) each of the pixel blocks (conversion), and (3) dividing each of coefficients, which has been converted by a given divider, (quantization step), and rounding off a remainder, (quantization).

The decoding process includes (4) separating into each kinds of data in a variable length code (VLC) decoder, (5) multiplying the quantization step with each of the coefficients for every pixel block (inverse-quantization), and (6) performing inverse-conversion (IDCT operation) for every pixel block, (inverse-conversion).

Next, the information compression using the inter-screen (time-serial) correlation uses a characteristic that consecutive moving pictures are closely similar to each other. That is, information is compressed by storing a previous picture and representing a current picture based on a difference value from the previous screen. When the previous picture is used, nothing is changed if a certain portion of the current picture does not have any change (still). If a certain portion of the previous screen is moved to create the certain portion of the current picture, a same pattern in the previous picture is found and a movement amount (motion vector) of the portion is fed and reproduced (this is called "movement compensation").

The information compression using a discrete code frequency uses a characteristic that frequencies are different among DCT coefficients, movement vector values, and the like. A short code length is allocated to a high frequency value of the DCT coefficients or the movement vector values while long code length is allocated to a low frequency value in order to reduce an average information amount. This is called variable length coding (each code has different length) or entropy coding (using a code frequency).

Figure 3:
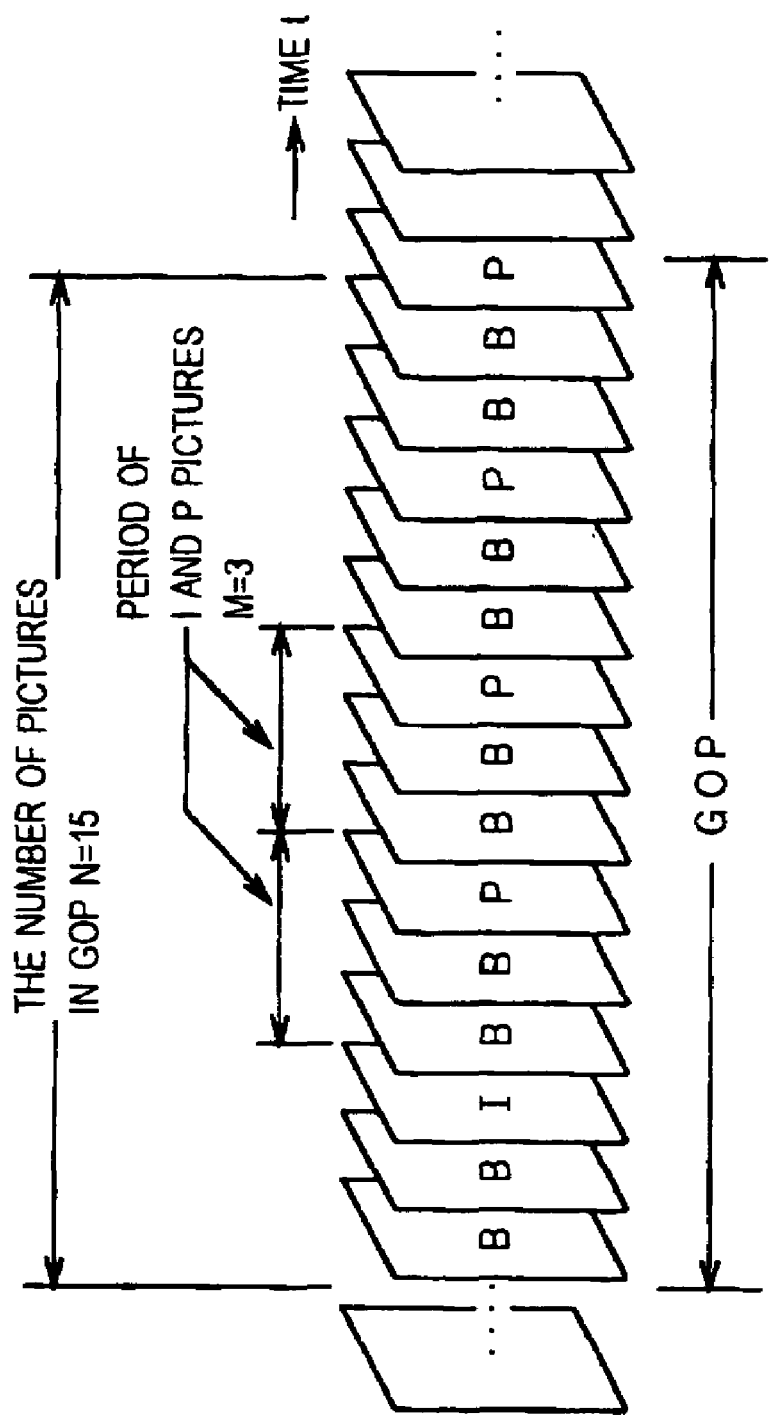
FIG. 3 is a diagram for describing I, B and P pictures constituting one(1) GOP based on the MPEG method.

Reproducing data from a storage media such as an optical disk requires trick modes including fast-forward, reverse, and play/reversed play from some midpoint. In order to obtain the trick modes, a group of pictures (GOP) structure is adopted, which is a collection of pictures as shown in FIG. 3. According to MPEG 2, since coded image data is originated to previous and subsequent image data, data of only one picture cannot be complete information by itself. Thus, random access is possible to a GOP as a unit collecting data of several screens. That is, a sequence header is prepared for each GOP as an entry point at each place so that random access can be achieved.

Figure 2A:
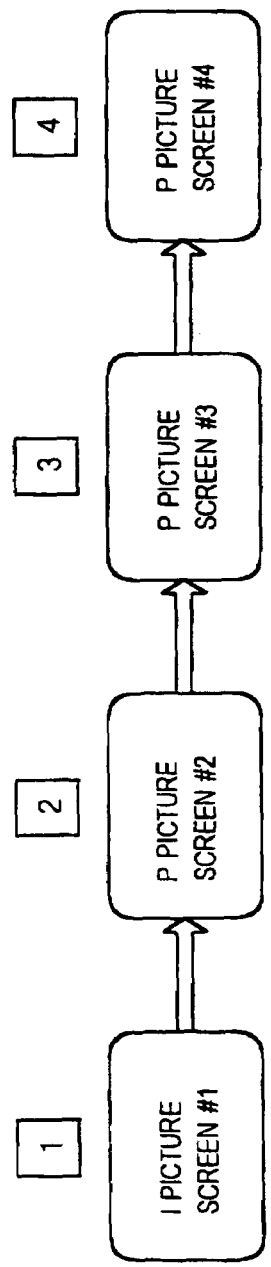
FIG. 2 is a diagram describing the order of encoding I, B and P pictures based on MPEG.
Figure 2B:
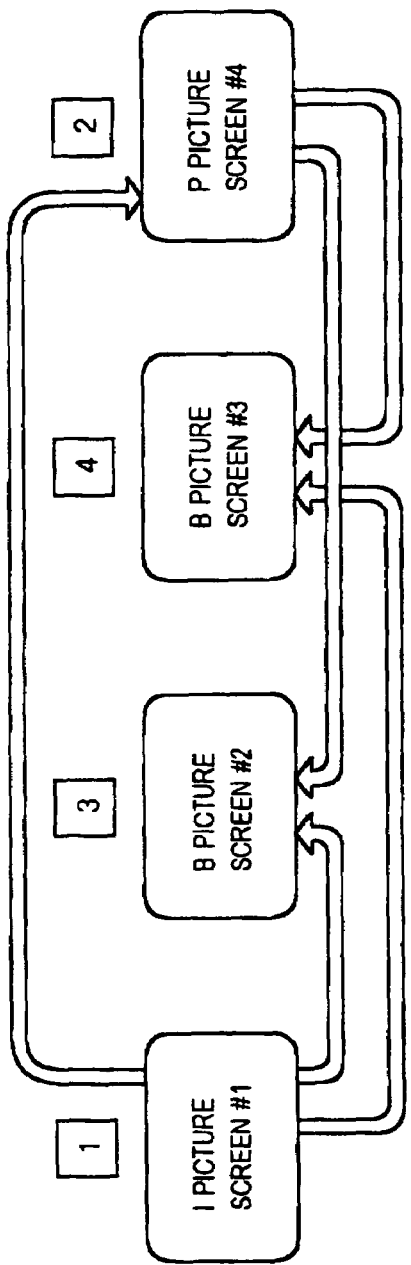

Predictive methods to be performed include a forward prediction using a past-reproduced image and a bi-directional prediction using a forward-predicted image and future reproduced image. As shown in FIGS. 2A and 2B, in order to achieve the bi-directional prediction, three types of I, P and B pictures are specified to images, respectively.

As shown in FIG. 2A, the I picture is an Intra-coded image (intra-frame coded image). That is, the I picture is a screen coded from its information and generated without using the interframe prediction. At least one I picture is required within the GOP for random access. Therefore, all macro-block type within the I picture is "Intra" block (intra-frame coding).

The P picture is a Predictive coded image (a forward inter-frame predictive coded image). That is, the P picture is generated by performing a prediction from the I or P picture. Generally, macro-block types within the P picture include both intra-frame (intra-frame coding) and inter-frame block (forward inter-frame predictive screen).

As shown in 2B, the B picture is a screen created based on the bi-directional predicted-coded picture and generally includes macro block types of intra-frame predictive coding, forward inter-frame predictive coding, inverse inter-frame predictive coding (predicted from the future one) and interpolate inter-frame predictive coding based on both previous and subsequent ones.

The I picture is for keeping the GOP independent while the P and B pictures may include the intra-coding in small blocks of parts within a picture. The I picture is a picture where a whole picture is intra-coded. The I and P pictures are coded in a same order as the one for an original image, as shown in FIG. 2A. However, as shown in FIG. 2B, I and P pictures are processed, and then reproduced I and P pictures are used to code B pictures inserted between them later.

FIG. 3 show an order of picture types within the GOP for each picture having been coded as such. Here, the number of pictures within the GOP is N=15, which includes one I picture, three P pictures having been coded subsequently (P picture screens #2 to 4 in FIG. 2A) and B pictures having been coded from those I and P pictures (B and P picture screens from #2 in FIG. 2B).

(Coding Method)

Figure 4:
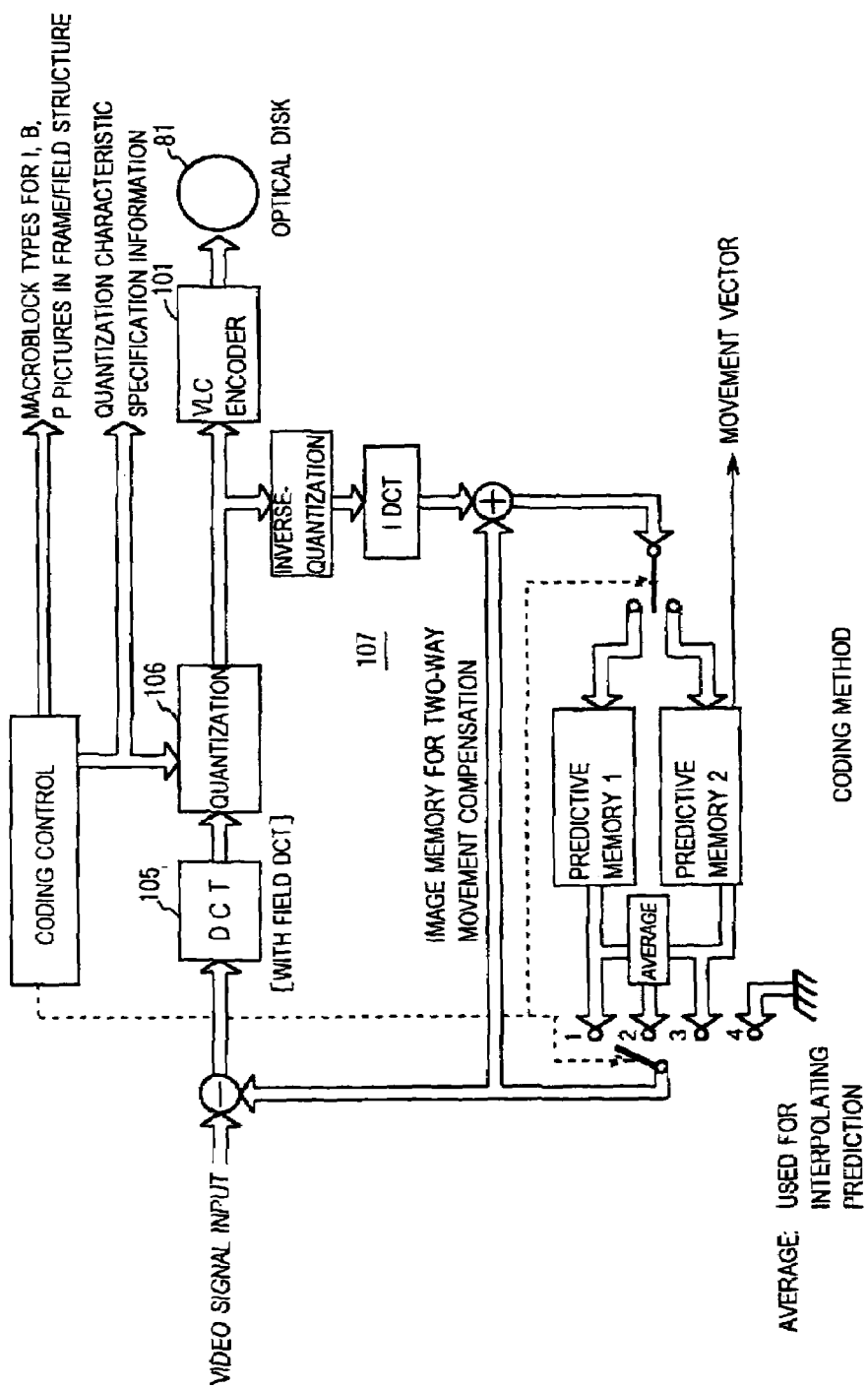
FIG. 4 is a diagram used to explain a coding (compressing) method based on MPEG 2, which is a typical example of the image compression technology.

FIG. 4 is a diagram showing an MPEG 2 coding device schematically in terms of hardware. The coding device has a discrete cosine transform (DCT) unit 105, a quantization unit 106 and a movement compensation unit 107.

In the DCT unit 105, an input image is divided into 8×8 pixel blocks and two-dimensional discrete cosine transform is performed on each of the blocks.

In the quantization device 106, DC (direct current) and AC (alternating current) components of DCT coefficients obtained through the DCT operation are quantized independently. Among quantized DCT coefficients, a difference value is coded which uses a DC coefficient of an immediately previous block as a predictive value for the DC component while the AC component is coded after being re-aligned by zigzag scanning or the like within the block.

The movement compensation unit 107 performs the movement compensation depending on image types. That is, in a moving image, significant correlation between adjacent frames is used for predictive coding (to represent a signal value of a certain pixel by a difference from a signal value of an image in another past or future time). Practically, a spatial shift (the movement vector described above) is detected such that values are the closest between a frame to be coded and a reference frame having been coded already. Then, a difference (predictive error) from the frame to be coded is coded by using as a predictive value a block at a position displaced by an amount equal to the above-described movement vector in the reference frame. In the movement compensation unit 107 shown as an example, inverse quantization, IDCT, and predictive memories 1 and 2 are used to perform compression based on inter-screen correlation.

(Decoding Method)

Figure 5:
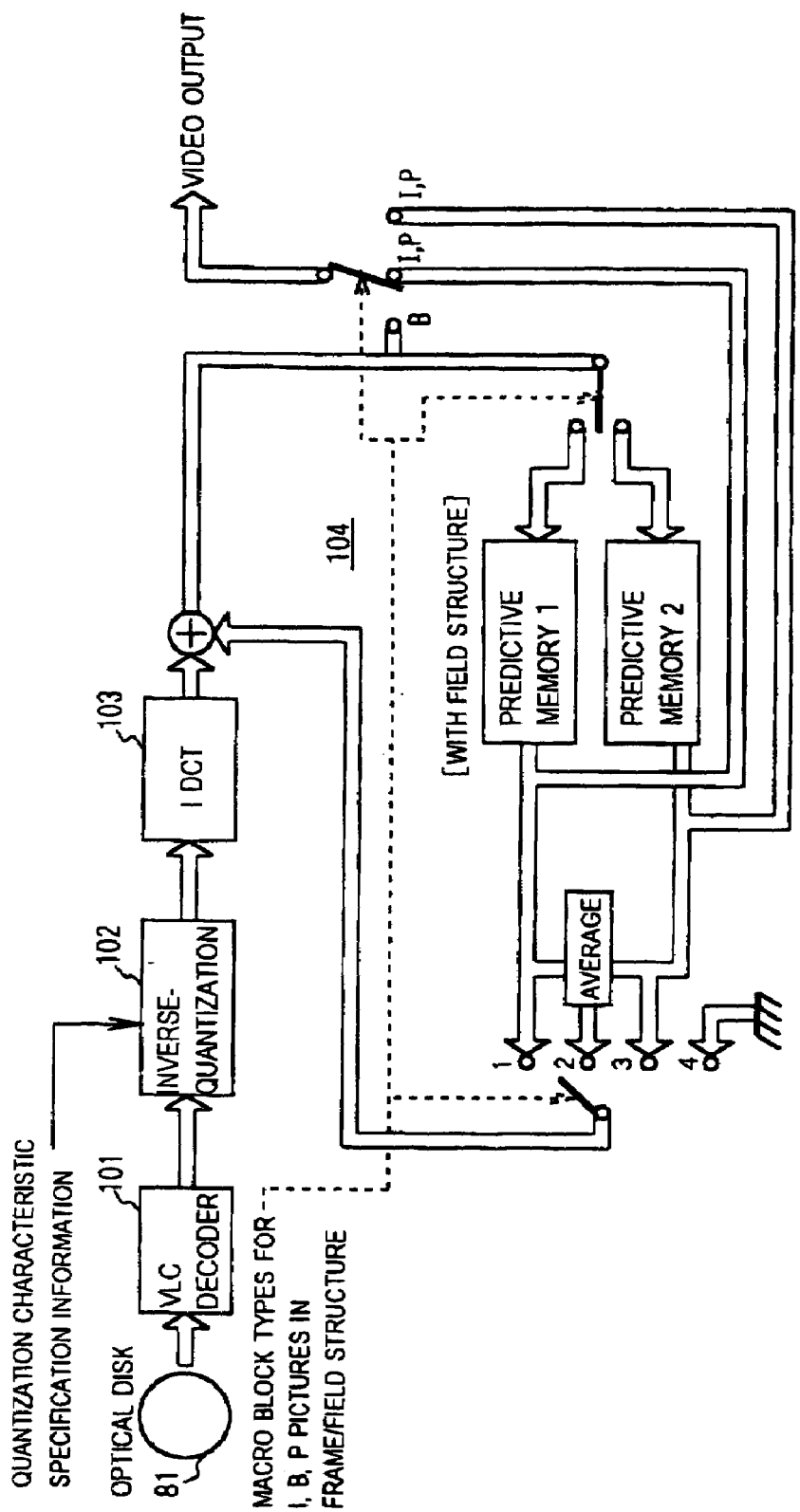
FIG. 5 is a diagram used to explain an expanding (decoding) method based on MPEG 2, which is a typical example of the image compression technology.

FIG. 5 is a diagram used to explain an overview of an MPEG 2 decoding device in terms of hardware. The decoding device includes a VLC decoder 101, an inverse quantization unit 102, an Inverse DCT (IDCT) unit 103 and a movement compensation unit 104.

Functions of each unit have reverse functions of each unit of the above-described coding device.

The VLC decoder 101 separates input compressed image data into each type of data.

The inverse-quantization unit 102 performs reverse processing of the quantization processing (106 in FIG. 4), that is, performs on quantized DCT coefficients among separated data processing for multiplying the quantization step with each coefficient for every pixel block.

The Inverse DCT (IDCT) unit performs reverse processing of the DCT processing (105 in FIG. 4), that is, performs inverse conversion (inverse DCT operation) on every pixel block.

[Decoding Image Data of Entertainment System]

Compressed image information is recorded in the optical disk 81 in entertainment systems such as a video game device. In this embodiment, the compressed image information is decoded efficiently by combining software units and hardware units.

(Movement Compensation Program Data Flow)

The optical disk 81 is used as a recording medium where application programs such as a game program are recorded. Image data compressed by using an image compression technology (highly efficient encoding technology) such as MPEG is recorded in the optical disk 81.

The compressed image data in the optical disk 81 loaded into the game device body is decoded by a decoding method as shown in FIG. 5. As described above, the decoding method includes broadly a VLC decoding process, an inverse quantization process, an inverse DCT (IDCT) process and a movement compensation process. Here, the movement compensation process tends to advance more rapidly in its technology as compared with the inverse-quantization process and the IDCT process. Therefore, it is not suitable that the movement compensation process is configured only by hardware units equipped in the game device body or is executed only by software units stored in a fixed ROM or the like. Rather, it is preferable that such a technology is configured by software units, which can be improved easily. Therefore, in this embodiment, the movement compensation program data is recorded in partial space of the optical disk 81 in order to achieve the movement compensation process by means of software units.

Figure 6:
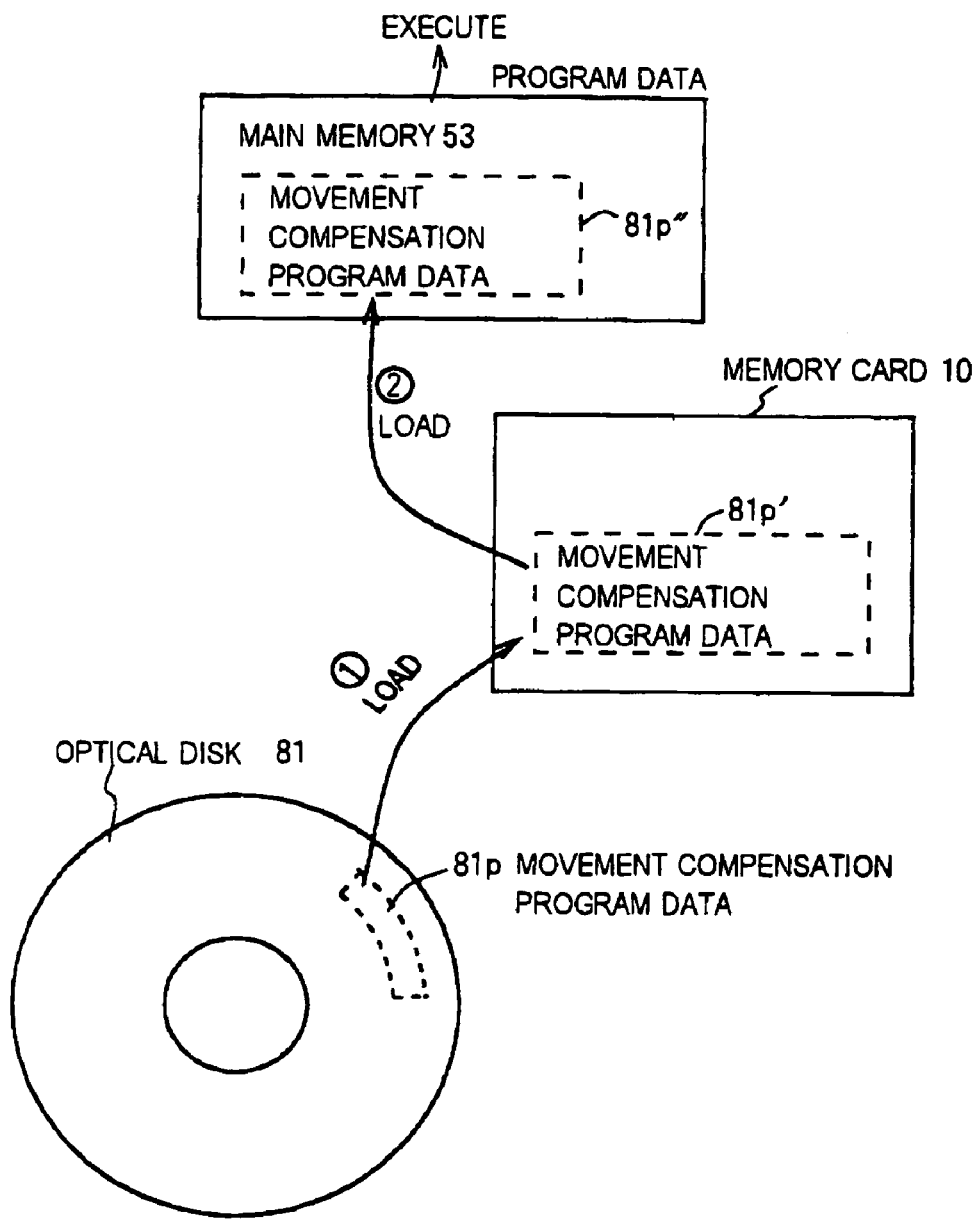
FIG. 6 is a diagram for describing how program data for movement compensation, which is a part of the decoding (expanding) process, is transferred.

FIG. 6 is a diagram used to explain how the movement compensation program data configured by software units is transferred into the video game device body.

As shown in FIG. 6, a movement compensation program 81*p* is recorded in a part of the recording space of the optical disk 81 purchased by a user.

In a first stage, the movement compensation program data 81*p* recorded in the optical disk 81 is transferred to the memory card 10 under the control of the CPU 51 in the entertainment system and is recorded as movement compensation program data 81*p*'.

In a second stage, the movement compensation program data 81*p*' recorded in the memory card 10 is transferred to the main memory 53 under the control of the CPU 51 and is recorded as a movement compensation program data 81*p*".

When the compressed image data recorded in the optical disk 81 is decoded, the movement compensation program data 81*p*" is used for decoding the compressed image data recorded in the optical disk 81 under the control of the CPU 51.

Here, only the movement compensation process is programmed in software. Further, it may be possible to program and record all of the inverse-quantization process, the inverse DCT process and the movement compensation process in the optical disk 81. Generally, software processing requires longer time as compared with hardware processing.

Then, in the entertainment system according to this embodiment, the movement compensation process, which is advancing relatively fast in view of technology, is programmed and recorded in the optical disk 81 such that an updated movement compensation technology can be easily provided in a game program with a new title.

On the other hand the like processes are configured by hardware units within the game device body such that faster decoding speed can be achieved.

In this way, in this embodiment, the decoding unit for compressed image data is realized by hardware units (VLC decoder 101, inverse quantization process unit and inverse DCT process unit) of the entertainment system and by storing program data for the movement compensation process in partial space of the optical disk 81. Then, as described with reference to FIG. 6, the movement compensation program data is read into the memory card 10 within the game device body and further read into the main memory 53 to be used for the movement compensation process.

Here, it may be possible that the movement compensation program data in the optical disk 81 is transferred to and written into the main memory 53 directly without being written in the memory card 10 temporarily. The memory card 10 removably installed in the entertainment system body is a recording medium where data can be recorded and deleted and game data can be recorded (saved) and read out (loaded), originally. That is, the memory card 10 is used for successively updating and recording data in the middle of a game. Thus, a vacant area in the memory card 10 can be used freely as memory which data can be recorded to and deleted from. Further, today, the memory card 10 is available in markets at very low prices, and users can prepare several of such cards.

On the other hand, various data is intensely recorded in the main memory 53 when a game is activated, and the memory space becomes insufficient. Therefore, the movement compensation program data recorded in the optical disk 81 is transferred and temporarily recorded in the memory card 10 and transferred and recorded into the main memory 53 when needed so that an insufficient memory space problem during the game activation can be handled easily.

It should be noted that, as in another embodiment, it may be possible that the CPU 53 reads out the movement compensation program data 81$p'$ recorded in the memory card 10 directly to execute the movement compensation process without transferring the movement compensation program data recorded in the memory card 10 to the main memory 53.

(Decoding Units)

Figure 7:
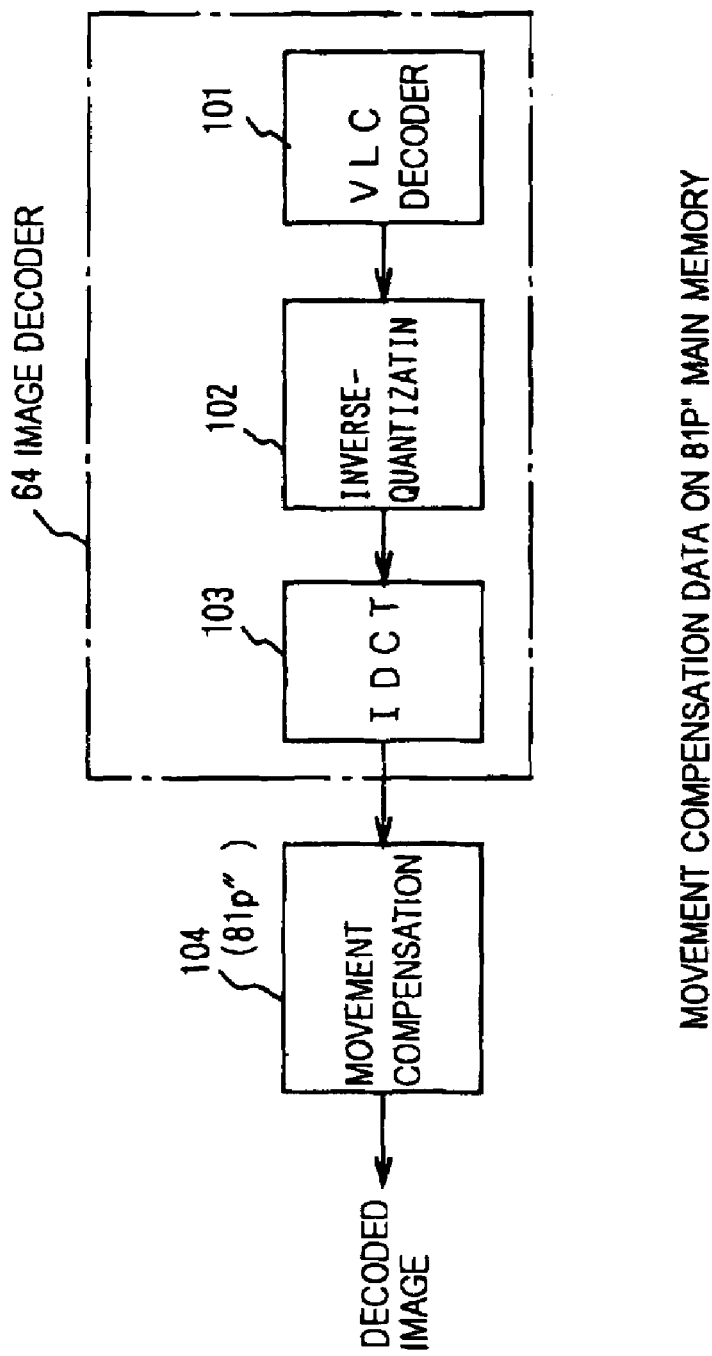
FIG. 7 is a diagram for describing an image decoder for expanding (decoding) the compressed image described in FIG. 4 and the movement compensation program.

FIG. 7 is a diagram showing decoding units for a compressed image of the entertainment system according to this embodiment. The image decoder 64 provided in the entertainment system includes the VLC decoder 101, the inverse-quantization unit 102 and the IDCT unit 103. They are preferably configured by hardware, but not limited to this. On the other hand, the movement compensation program is recorded in the main memory 53 or the memory card 10, as described with reference to FIG. 6.

The compressed image data recorded in the optical disk 81 is separated into each kind of data by the VLC decoder 101 within the image decoder 64.

Further, quantized DCT coefficients in there are inverse-quantized by the inverse-quantization unit 102 and inverse DCT converted by the IDCT unit 103.

Then, they are processed depending on image types (I picture, P picture, B picture) by the movement compensation program data 81$p''$ transferred to the main memory 53 to obtain decoded images. However, if the movement compensation program is not transferred to the main memory 53 and is still stored in the memory card 10, it is used for the movement compensation process. In another embodiment described later, if the movement compensation program is not transferred to the main memory 53 and is stored in the flash memory 55, it is used for the movement compensation process.

The decoded images are output as video outputs through the GPU 62 and displayed by a display device, not shown.

Here, it is not limited to have the VLC decoder 101, the inverse quantization unit 102 and the IDCT unit 103 within the image decoder 64 and to record the movement compensation program data 81$p''$ within the recording unit (main memory 53, memory card 10 or flash memory 55). As desired, the VLC decoder 101 may be provided within the image decoder 64 and the inverse quantization unit 102 and the movement compensation program data 81$p''$ may be recorded within the recording unit (main memory 53, memory card 10 or flash memory 55).

[Entertainment System Processing Flow]

Next, a typical example of, but not limiting to, the above-described decoding processing will be described with reference to its flowchart.

(Main Routine)

Figure 8:
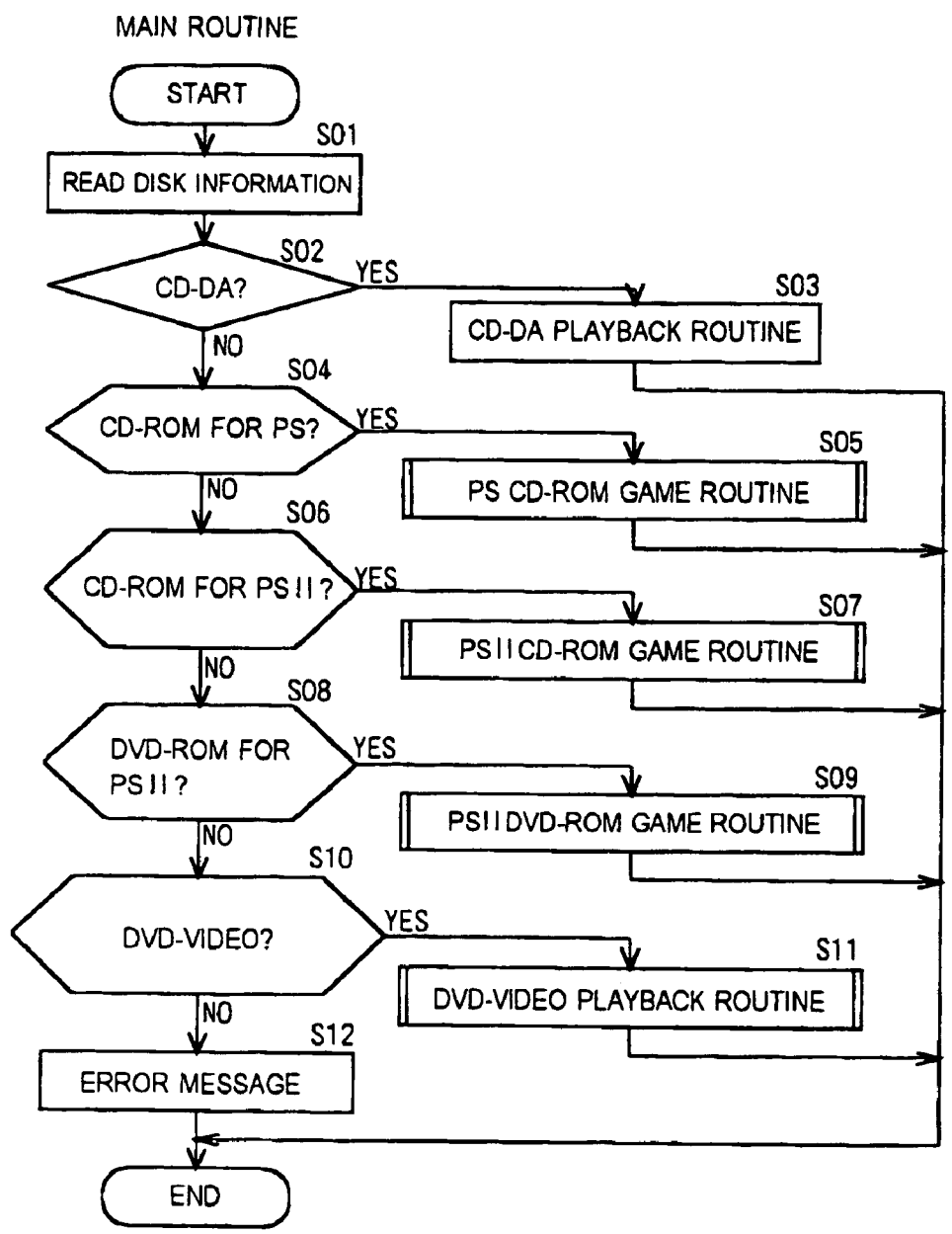
FIG. 8 shows a main routine of a flow for expanding (decoding) a compressed image.

FIG. 8 shows a main routine in a decoding process flow chart, and shows clearly a procedure for specifying a type of a recording medium where game software is recorded. The entertainment system of this embodiment can play a compact disc-digital audio (CD-DA), a CD-ROM for PLAY STATION™, a CD-ROM for Play Station 2 (an entertainment system under new development), a DVD-ROM for the Play Station 2, a DVD-VIDEO for the Play Station 2, etc, presently. Of course, the present invention is not limited to them.

In a step S01 shown, disk information is read out from an optical disk loaded in a disk drive.

In a step S02, it is determined whether the optical disk is a CD-DA or not. If the optical disk is a CD-DA, the procedure goes to a CD-DA playback routine in a step S03. Since a CD-DA carries only audio information, it does not relate to reproducing a compressed image described in this embodiment in principle.

If the optical disk is not a CD-DA, the procedure goes to a step S04, and it is determined whether it is a CD-ROM with a game for the PLAY STATION recorded or not. If the optical disk is a CD-ROM for the PLAY STATION, the procedure goes to a PLAY STATION CD-ROM game routine in a step S05.

If the optical disk is not a CD-ROM for the PLAY STATION, the procedure goes to a step S06, and it is determined whether it is a CD-ROM with a game for the Play Station 2 recorded or not. If the optical disk is a CD-ROM for the Play Station 2, the procedure goes to a Play Station 2 CD-ROM game routine in a step S07.

If the optical disk is not a CD-ROM for the Play Station 2, the procedure goes to a step S08, and it is determined whether it is a DVD-ROM with a game for the Play Station 2 recorded or not. If the optical disk is a DVD-ROM for the Play Station 2, the procedure goes to a Play Station 2 DVD-ROM game routine in a step S09.

If the optical disk is not a DVD-ROM for the Play Station 2, the procedure goes to a step S10, and it is determined whether it is a DVD-VIDEO with general video information such as a movie recorded or not. If the optical disk is a DVD-VIDEO, the procedure goes to DVD-VIDEO playback routine in a step S11.

If the optical disk is not a DVD-VIDEO, an error message such as "This entertainment system can not play this optical disk" is displayed in the display device in a step S02. Here, the recording medium with the compressed image recorded may be any one of four kinds including CD-ROM for PLAY STATION, CD-ROM for Play Station 2, DVD-ROM for Play Station 2 and DVD-VIDEO, but excluding a CD-DA. Therefore, compressed images are reproduced as described next in four reproducing processes including the PLAY STATION game routine (S05), the Play Station 2 CD-ROM game routine (S07), the Play Station 2 DVD-ROM routine (S09) and the DVD-VIDEO playback routine (S11).

(Writing-To-Memory-Card Routine)

Figure 9:
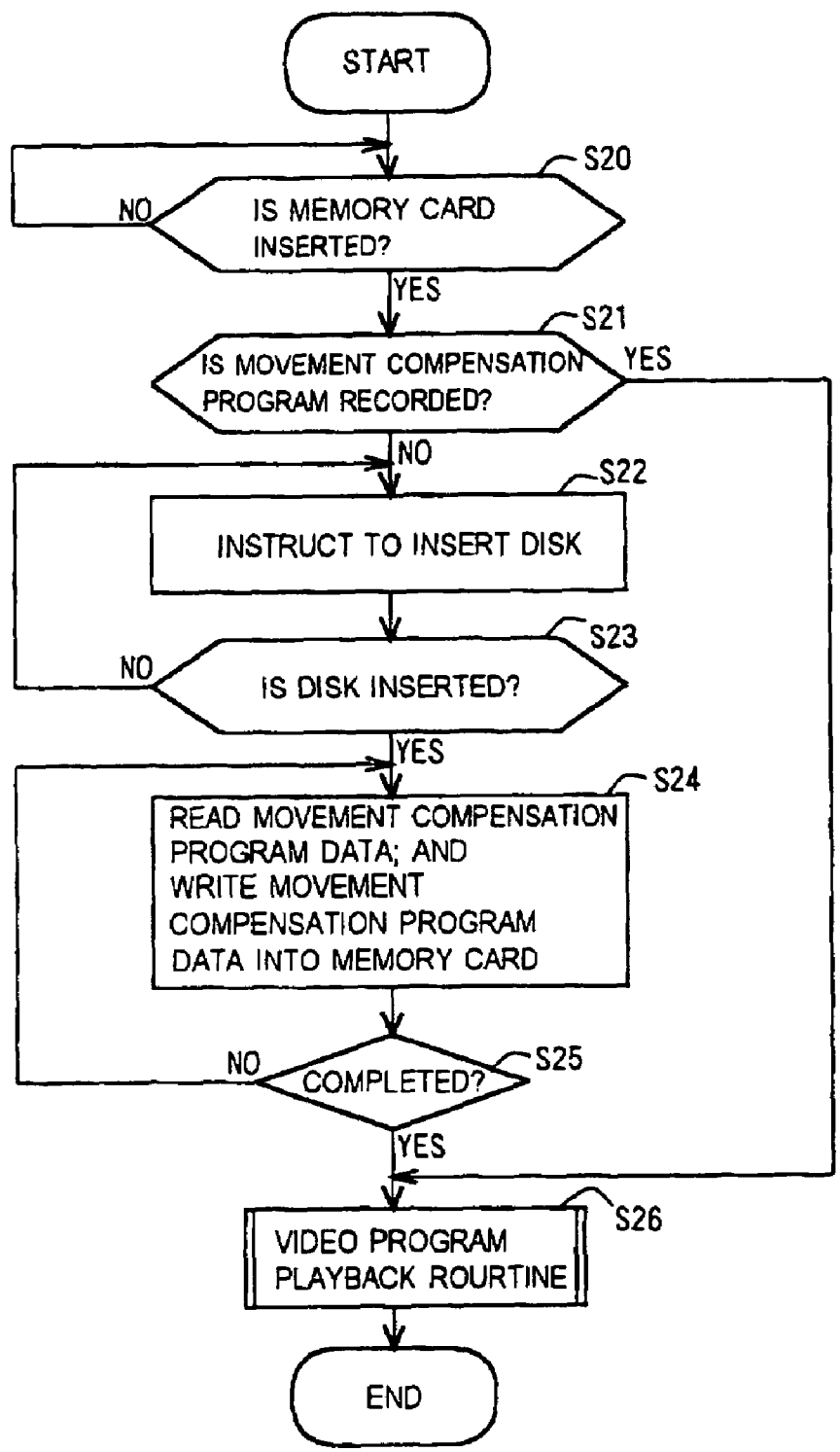
FIG. 9 shows a subroutine for recording in a memory card the movement compensation program of the flow for expanding (decoding) the compressed image.

FIG. 9 shows a flowchart for describing a procedure for transferring and writing the movement compensation program recorded in the optical disk 81 to the memory card 10.

In a step S20, it is determined whether the memory card 10 is inserted into the entertainment system body or not. If the memory card 10 is not inserted, this determination step is repeated.

If the memory card 10 is inserted, in a step S21, it is determined whether the movement compensation program is recorded in the memory card 10 or not. If the movement compensation program has been recorded already, the procedure goes to a step S26 and goes to a routine for reproducing a program for compressed images recorded in the optical disk. The video program reproducing routine is one for a recording medium with compressed images recorded thereon, that is, either one of four kinds including CD-ROM for PLAY STATION, CD-ROM for Play Station 2, DVD-ROM for Play Station 2 and DVD-VIDEO, but excluding a CD-DA. Of course, it does not prevent the inclusion of other recording media achieved through future improvement.

If the movement compensation program has not been recorded yet, it instructs to load the optical disk 81 in the entertainment system (loading) in a step S22. This instruction is supplied to a user through a display device, not shown, for example.

In step S23, it is determined whether the optical disk 81 is loaded in the entertainment system main body or not. If the optical disk 81 has not been loaded, the loading instruction in the step S22 continues.

If the optical disk 81 has been loaded in the entertainment system main body already, the movement compensation program data recorded in the optical disk 81 is transferred and written to the memory card 10 under control by the CPU 51 in a step S24.

Next, in a step S25, it is determined whether the movement compensation program data has completed being written into the memory card 10. If it has not been completely written, writing in the step S24 continues.

If it has completed writing the movement compensation program data into the memory card 10, the procedure goes to a step S26, where a reproducing routine for compressed image data recorded in the optical disk 81 is performed.

(Compressed Image Data Reproducing Routine)

Figure 10:
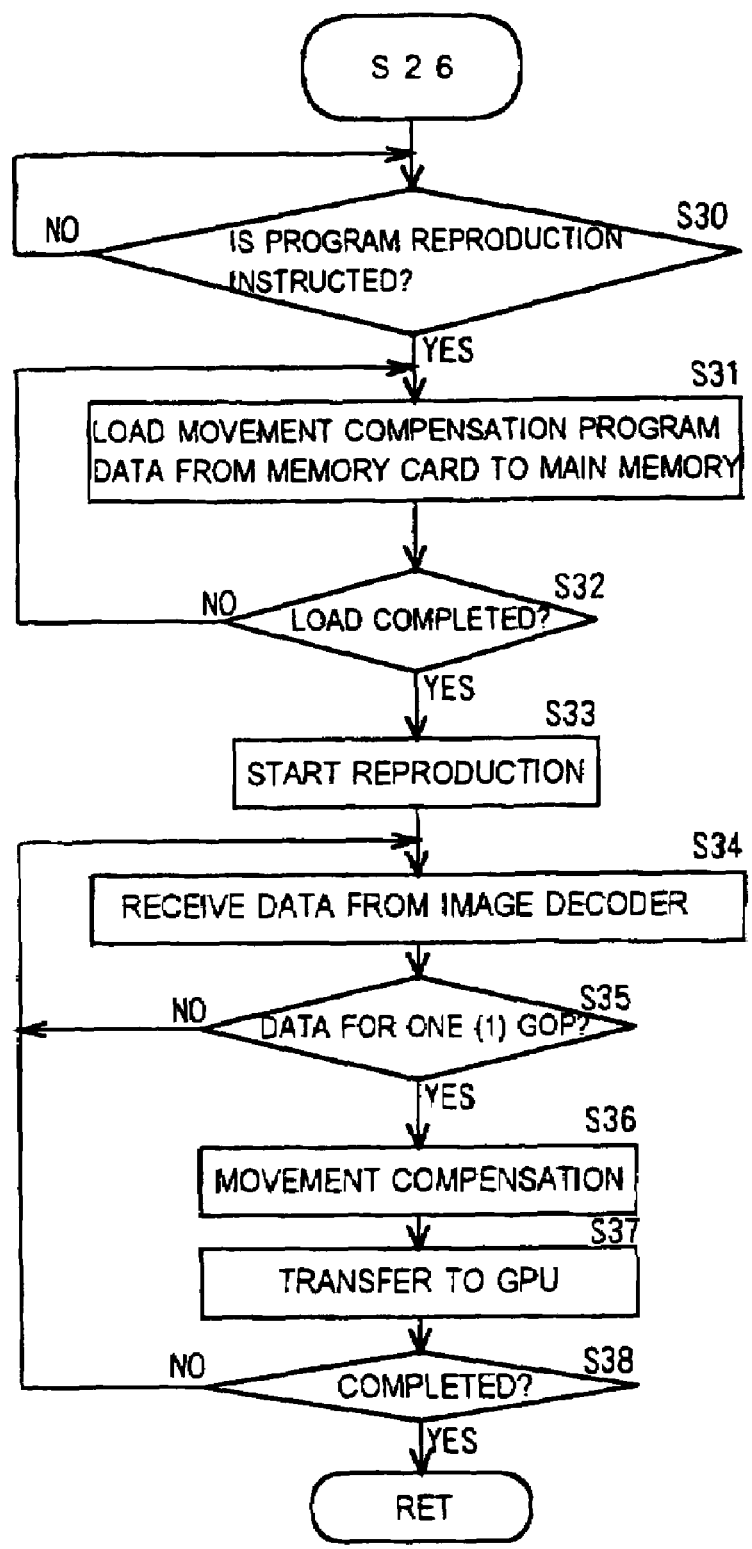
FIG. 10 shows a practical decoding process subroutine of the flow for expanding (decoding) the compressed image when the subroutine shown in FIG. 9 is performed.

FIG. 10 is a diagram for showing a flow for reproducing compressed images recorded in the optical disk 81 (step S26 in FIG. 9).

In a step S30, it is determined whether there is an instruction for reproducing program data in the disk information of the optical disk 81 or not. If not, this determination step is repeated.

If there is an instruction for reproducing program data, the movement compensation program data to be written into the memory card 10 is transferred and written to the main memory 53, in a step S31 (loading). In a step S32, it is determined whether the loading is completed or not. If it is not completed, the loading to the main memory 53 in the step S31 continues.

Once all of the movement compensation program is loaded from the memory card 10 to the main memory 53, the procedure begins to reproduce compressed image data recorded in the optical disk 81, in a step S33. Specifically, the VLC decoding process, the invert-quantization process and invert-DCT process are performed successively in the image decoder 64.

In a step S34, the main memory 53 begins to receive successively from the image decoder 64 image data on which those processes have been performed in the image decoder 64.

In a step S35, it is determined whether image data for one (1) GOP has been written into the main memory 53 or not. If it has not reached the image data for one GOP, the receiving of image data in the step S34 continues.

Once image data for one GOP is written into the main memory 53, the movement compensation program having been loaded within the main memory 53 is used to perform the movement compensation process (step S36). Image data on which the movement compensation process has been performed is sent to the GPU 62, where necessary processing is performed on it (step S37) and then it is displayed by the display device, not shown.

In a step S-38, it is determined whether all of the GOP constituting image data in the optical disk 81 is completely processed or not, that is, whether all of the compressed image data is completely decoded or not. If it is not completed, processing in the steps S34 to S37 is repeatedly performed on image data for the next GOP.

If all of the processing on the compressed image data is completed, the procedure terminates the routine for reproducing compressed images (step S26 in FIG. 9) and returns (RET) to the writing-to-memory-card routine and terminates.

(Writing-To-Flash-Memory Routine)

It should be noted that while the example where the memory card 10 is installed in the communication control unit 90 is described in the above-described embodiment of the present invention, a ROM (see reference numeral 55 in FIG. 1, for example), rather than the memory card 10, which can be written to at least once, may be provided in the control system 50 and the movement compensation program data may be stored in the memory in the electronic device through the ROM.

As such a ROM, a flash memory or electrically erasable programmable read only memory (EEPROM) may be used. The EEPROM is a ROM which can be rewritten any number of times and contents having been written are erased electrically by each one bite when being rewritten. The flash memory is a ROM, which can be rewritten any number of times like the EEPROM and contents having been written are erased electrically by one operation or in blocks when rewritten. For a structure according to the present invention, the above-described flash memory may be preferably adopted.

It should be noted that a programmable ROM (PROM) which can be written to only once and an EPROM which can be written to any number of times and whose written data can be erased by ultraviolet rays are known as the ROM which can be written to at least once in addition to the above-described EEPROM and flash memory. If either of the PROM and EPROM, which can be written to only once, is adopted, it is preferable that a socket or the like is equipped in the entertainment system body to achieve a structure where those semiconductor elements can be removably inserted.

Figure 11:
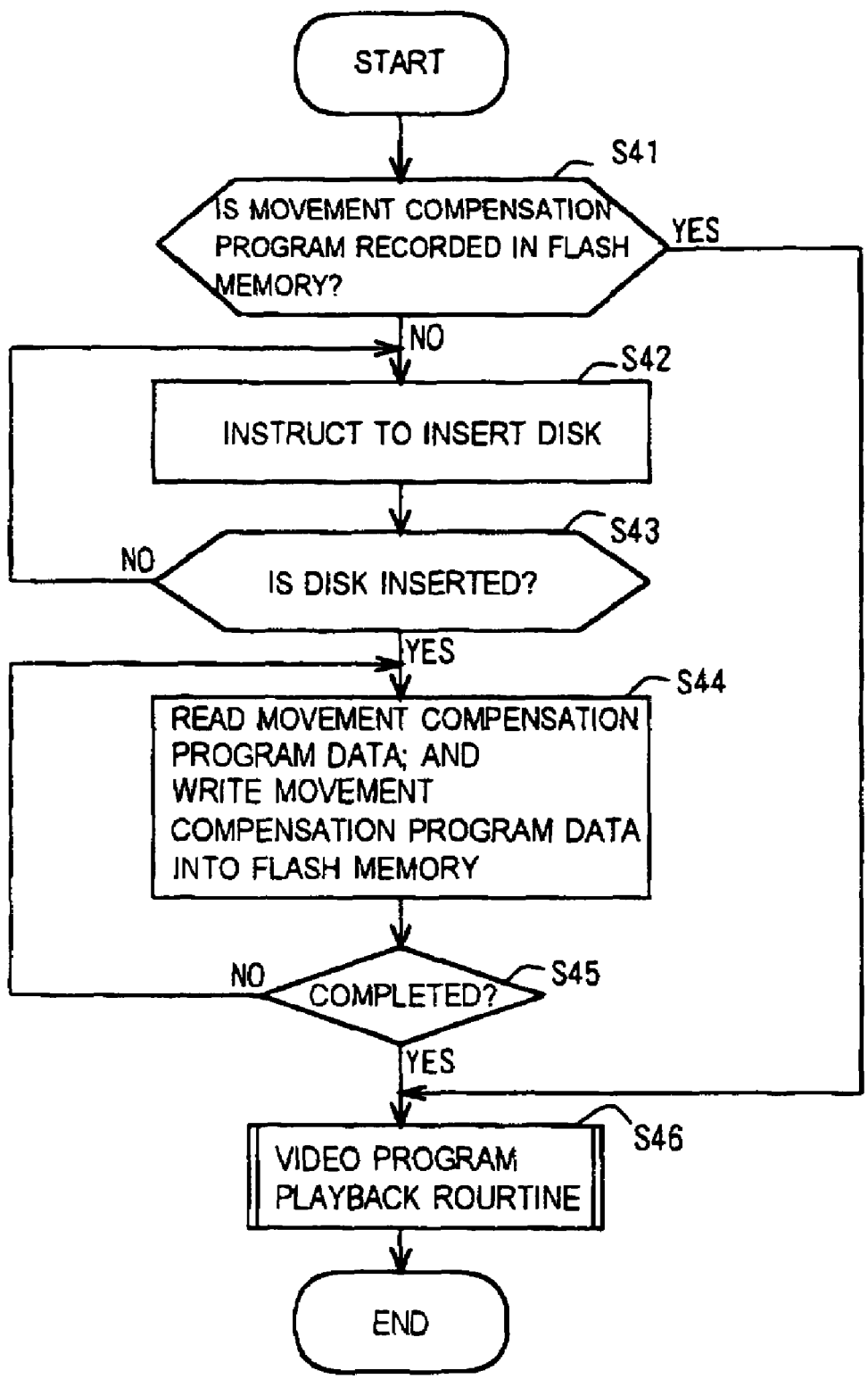
FIG. 11 shows a subroutine for recording in a flash memory the movement compensation program of the flow expanding (decoding) the compressed image.

Now, a writing routine and reproducing routine when the flash memory (reference numeral 55 in FIG. 1) is adopted will be described with reference to FIG. 11. The procedure for transferring and writing the movement compensation program recorded in the optical disk 81 to the flash memory 55 in the decoding process when the flash memory 55 is used is substantially the same as the flow for describing processes for transferring and writing the movement compensation program recorded in the optical disk 81 to the memory card 10 as shown in FIG. 9.

The above-described CPU 51 determines whether the flash memory 55 is installed into the above-described entertainment system body when the entertainment system is started up, for example, or not. If it is determined the flash memory 55 is installed, in a step S44, it is first determined whether the movement compensation program has already been recorded in the flash memory 55 or not. The step S41 corresponds to the step S21 in FIG. 9. If the movement compensation program has already been recorded in the above-described flash memory 55, the procedure goes to a step S46 corresponding to the step S26 in FIG. 9. That is, it goes to the program reproducing routine for compressed image data recorded in the optical disk 81.

If the movement compensation program has not been recorded yet, the procedure goes to a step S42, where it instructs to load the optical disk 81 in the entertainment system (loading).

Next, in a step S43, it is determined whether the optical disk 81 has been loaded into the entertainment system body or not. If the optical disk 81 has not been loaded yet, the loading instruction in the step S42 continues.

If it is determined that the optical disk 81 has been loaded in the entertainment system body, the movement compensation program data recorded in the optical disk 81 is transferred and written to the flash memory 55 under control by the CPU 51 in a step S44.

Next, in a step S45, it is determined whether the movement compensation program data has completed being written into the flash memory 55. If it has not been completely written, writing in the step S44 continues.

Figure 12:
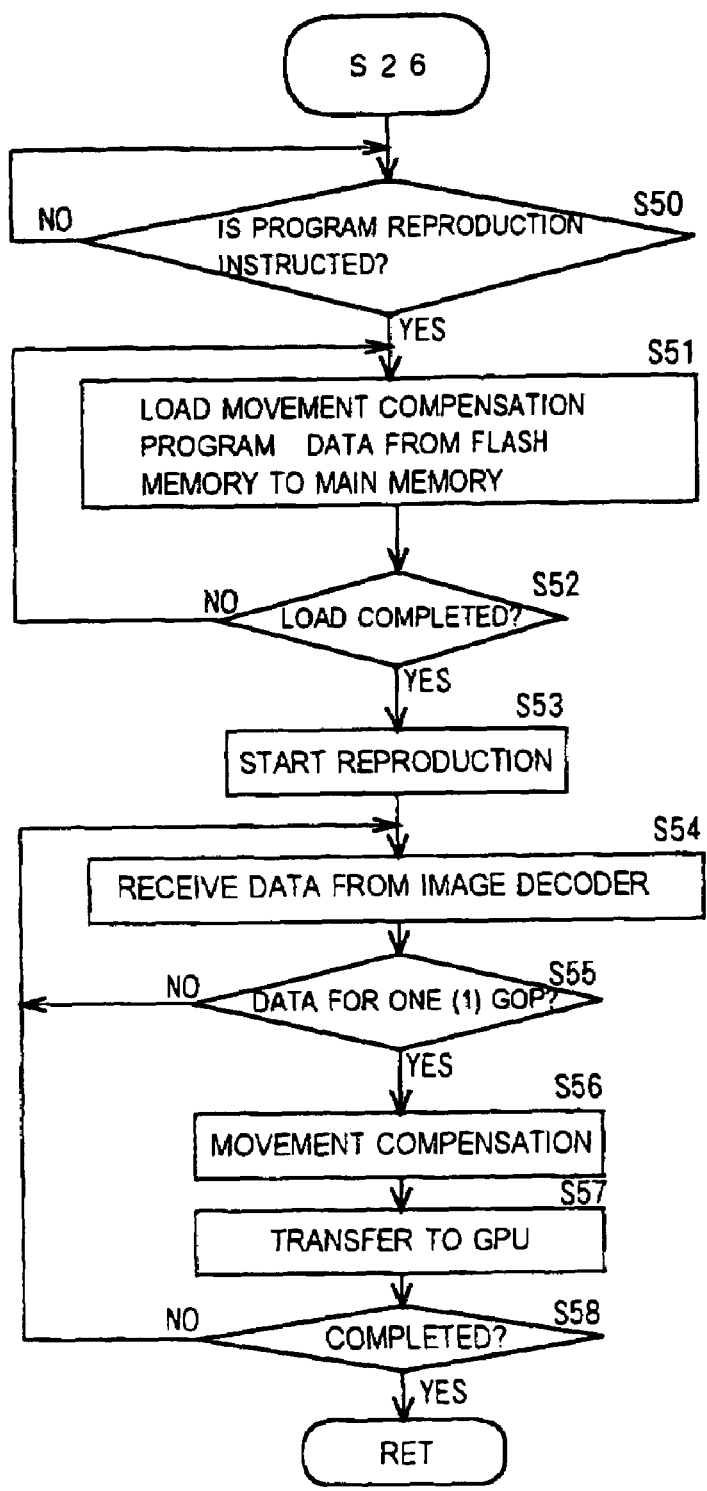
FIG. 12 is a practical decoding process subroutine of the flow for expanding (decoding) the compressed image when the subroutine shown in FIG. 11 is performed.

If it has completed writing the movement compensation program data into the flash memory 55, the procedure goes to a step S46, where a reproducing routine for compressed image data recorded in the optical disk 81 is performed, as shown in FIG. 10. Now, the reproducing routine in this case will be described briefly with reference to FIG. 12.

(Compressed Image Data Reproducing Routine)

First of all, it is determined whether there is an instruction for reproducing program data in the disk information of the optical disk 81 or not (step S50). If not, this determination step is repeated. If there is an instruction for reproducing program data, the movement compensation program data written into the flash memory 55 is transferred and written to the main memory 53, in a step S51 (loading). In a step S52, it is determined whether the loading is completed or not. If it is not completed, the procedure returns to the step S51 and the loading to the main memory 53 continues.

Once all of the movement compensation program is loaded from the flash memory 55 to the main memory 53, the procedure begins to reproduce compressed image data recorded in the optical disk 81, in a step S53. That is, the VLC decoding process, the invert-quantization process and invert-DCT process are performed successively in the image decoder 64, as described in FIG. 10.

In a step S54, the main memory 53 begins to receive successively from the image decoder 64 image data on which those processes have been performed in the image decoder 64.

In a step S55, it is determined whether image data for one (1) GOP has been written into the main memory 53 or not. If it has not reached the image data for one GOP, the receiving of image data in the step S54 continues.

Once image data for one GOP is written into the main memory 53, the movement compensation program having been loaded within the main memory 53 is used to perform the movement compensation process (step S56). Image data on which the movement compensation process has been performed is sent to the GPU 62, where necessary processing is performed on it (step S57) and then it is displayed by the display device, not shown.

Finally, in a step S58, it is determined whether all of the GOP constituting image data in the optical disk 81 is completely processed or not, that is, whether all of the compressed image data is completely decoded or not. If it is not completed, processing in the steps S54 to S57 is repeatedly performed on image data for the next GOP.

If all of the processing on the compressed image data is completed, the procedure terminates the routine for reproducing compressed images (step S46 in FIG. 11) and returns (RET) to the writing-to-flash-memory 55 routine (step S44 in FIG. 11) and terminates.

According to the present invention, it is possible to provide new method of and electronic device for decoding compressed image data and auxiliary storage device.

Moreover, according to the present invention, in the processing for coding compressed information recorded in the recording medium, it is possible to provide a method of and electronic device for decoding compressed data which can allow future update and improvement and allows real-time decoding processing.

What is claimed is:

1. A method for decoding compressed image data recorded in an optical disk, comprising the steps of:
    recording program data capable of performing partial decoding, in addition to the compressed image data, in the optical disk in advance;
    recording the program data in a memory of an electronic device when the optical disk is loaded in the electronic device;
    reading the compressed image data from the optical disk into the electronic device and partially decoding the compressed image data using a decoding unit arranged in the electronic device; and
    decoding the partially decoded compressed image data by the program data recorded in the memory of the electronic device.

2. A method for decoding compressed image data according to claim 1, wherein the step of recording the program data in the memory of the electronic device includes the step of recording the program data in a memory card removably installed in the electronic device.

3. A method for decoding compressed image data according to claim 1, wherein the step of recording the program data in the memory of the electronic device includes the steps of recording the program data temporarily in a memory card removably installed in the electronic device, and then recording the program data recorded in the memory card in a main memory within the electronic device.

4. A method for decoding compressed image data according to claim 1, wherein the step of recording the program data in the memory of the electronic device includes the step of loading and recording the program data in a ROM provided in the electronic device, the ROM being capable of being written to at least once.

5. A method for decoding compressed image data according to claim 1, wherein the step of recording the program data in the memory of the electronic device includes the steps of loading and recording the program data in a ROM provided in the electronic device, the ROM being capable of being written to at least once, and then recording the program data recorded in the ROM in a main memory within the electronic device.

6. A method for decoding compressed image data according to any one of claim 4 or 5, wherein the ROM is a flash memory.

7. A method for decoding compressed image data according to any one of claims 1 to 5, wherein the optical disk is selected from the group consisting of a CD-ROM, a DVD-ROM and a DVD-VIDEO.

8. A method for decoding compressed image data according to any one of claims 1 to 5, wherein the electronic device is an entertainment system.

9. A method for decoding compressed image data according to any one of claims 1 to 5, wherein the electronic device is a game device and the compressed image data is a game program.

10. A method for decoding compressed image data according to any one of claims 1 to 5, wherein the compressed image data is compressed based on the MPEG method.

11. A method for decoding compressed image data according to any one of claims 1 to 5, wherein the program data is movement compensation program data.

12. A method for decoding compressed image data according to any one of claims 1 to 5, wherein the steps of reading the compressed image data from the optical disk into the electronic device and using a decoding unit arranged in the electronic device to partially decode the compressed image data are performed by VLC decoding means, inverse-quantization means and IDCT means provided in an image decoding means in the electronic device.

13. A method for decoding compressed image data according to claim 12, wherein the VLC decoding means, the inverse-quantization means and the IDCT means are configured by hardware means.

14. An electronic device for decoding compressed image data recorded in an optical disk, comprising:
  image decoding means for reading the compressed image data from the optical disk into the electronic device and for partially decoding the compressed image data; and
  memory means for reading and recording program data capable of performing partial decoding, when the optical disk is loaded in the electronic device, wherein the optical disk is recorded with the program data in addition to the compressed image data in advance, and wherein the compressed image data is read from the optical disk into the electronic device, the image decoding means is used to partially decode the compressed image data, and the compressed image data having been decoded is decoded partially by the program data recorded in the memory means in the electronic device.

15. An electronic device according to claim 14, further comprising a memory card removably installed in the electronic device; wherein the program data recorded in the optical disk is read and recorded in the memory card, and wherein the compressed image data is read from the optical disk into the electronic device, the image decoding means is used to decode the compressed image data partially, and the compressed image data having been decoded is partially decoded by the program data recorded in the memory card.

16. An electronic device according to claim 14, further comprising a memory card removably installed in the electronic device, wherein the program data recorded in the optical disk is read and temporarily recorded into the memory card and further the program data recorded in the memory card is read and recorded into a main memory within the electronic device, and the compressed image data is read from the optical disk into the electronic device, the image decoding means is used to decode the compressed image data partially, and the compressed image data having been decoded is partially decoded by the program data recorded in the main memory.

17. An electronic device according to claim 14, further comprising a ROM equipped in the electronic device, the ROM being capable of being written to at least once, wherein the program data recorded in the optical disk is read and recorded into the ROM, and the compressed image data is read from the optical disk into the electronic device, the image decoding means is used to decode the compressed image data partially, and the compressed image data having been decoded is partially decoded by the program data recorded in the ROM.

18. An electronic device according to claim 14, further comprising a ROM equipped in the electronic device, the ROM being capable of being written to at least once, wherein the program data recorded in the optical disk is read and recorded temporarily into the ROM, the program data recorded in the ROM is read out and recorded into a main memory within the electronic device, the compressed image data is read from the optical disk into the electronic device, the image decoding means is used to decode the compressed image data partially, and the compressed image data having been decoded is partially decoded by the program data recorded in the main memory.

19. An electronic device according to any one of claim 17 or 18, wherein the ROM is a flash memory.

20. An electronic device according to any one of claims 14 to 18, wherein the optical disk is selected from the group consisting of a CD-ROM, a DVD-ROM and a DVD-VIDEO.

21. An electronic device according to any one of claims 14 to 18, wherein the electronic device is an entertainment system.

22. An electronic device according to any one of claims 14 to 18, wherein:
  the electronic device is a game device; and
  the compressed image data is a game program.

23. An electronic device according to any one of claims 14 to 18, wherein:
  the compressed image data is compressed based on the MPEG method.

24. An electronic device according to any one of claims 14 to 18, wherein the program data is movement compensation program data.

25. An electronic device according to any one of claims 14 to 18, wherein the image decoding means for reading the compressed image data from the optical disk into the electronic device and decoding the compressed image data partially includes VLC decoding means, inverse-quantization means and IDCT means.

26. An electronic device according to claim 25, wherein the VLC decoding means, the inverse-quantization means and the IDCT means are configured by hardware means.

* * * * *

UNITED STATES PATENT AND TRADEMARK OFFICE
CERTIFICATE OF CORRECTION

PATENT NO.    : 6,970,642 B1
DATED         : November 29, 2005
INVENTOR(S)   : Ken Kutaragi It is certified that error appears in the above-identified patent and that said Letters Patent is hereby corrected as shown below:

Column 3,
Line 1, "Further" should start a new paragraph.

Column 12,
Line 27, delete "a".

Column 16,
Line 5, "S-38" should read -- S38 --.

Column 18,
Line 62, "claim" should read -- claims --.

Column 20,
Line 28, "claim" should read -- claims --.

Signed and Sealed this

Seventh Day of March, 2006

JON W. DUDAS
*Director of the United States Patent and Trademark Office*